(12) United States Patent
Gu et al.

(10) Patent No.: US 12,563,564 B2
(45) Date of Patent: Feb. 24, 2026

(54) LATENCY REDUCING TECHNIQUES FOR CONTROL CHANNEL DECODING

(71) Applicant: GREATER SHINE LIMITED, New Taipei (TW)

(72) Inventors: Jian Gu, San Diego, CA (US); Bin Liu, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 499 days.

(21) Appl. No.: 18/146,918

(22) Filed: Dec. 27, 2022

(65) Prior Publication Data

US 2023/0134055 A1 May 4, 2023

Related U.S. Application Data

(63) Continuation of application No. PCT/US2021/017502, filed on Feb. 10, 2021.

(Continued)

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0061* (2013.01); *H04W 24/10* (2013.01); *H04W 72/541* (2023.01)

(58) Field of Classification Search
CPC ..... H04W 72/23; H04W 72/54; H04W 72/12; H04W 72/08; H04W 72/20; H04W 72/04;
(Continued)

(56) References Cited

U.S. PATENT DOCUMENTS 6,851,083 B1 * 2/2005 Hagenauer ........ H03M 13/6312
714/776
7,593,339 B2 * 9/2009 Shoemake ............ H04L 1/0002
370/252

(Continued)

FOREIGN PATENT DOCUMENTS

WO 2017001025 A1 1/2017
WO 2019125256 A1 6/2019

OTHER PUBLICATIONS

Supplementary European Search Report in the European application No. 21853387.5, mailed on Oct. 20, 2023. 11 pages.
(Continued)

*Primary Examiner* — Man U Phan
(74) *Attorney, Agent, or Firm* — PERKINS COIE LLP

(57) ABSTRACT

Introduced here are techniques for reducing the latency at a terminal device. In particular, for reducing the latency of detecting the downlink control information (DCI) in a downlink signal such as the physical downlink control channel (PDCCH) signal. The techniques include determining a probability of each aggregation level of the control channel elements (CCE) in a signal carrying the DCI. The probability can be based on the packet error rate (PER) of the signal. The PER can vary based on factors such as the signal to noise ratio (SNR) and/or the fading measurements. Further, the probability can depend on the reception history of the terminal device. Based on these factors, the terminal device can decode the CCEs in an order indicative of the probability of the corresponding aggregation levels carrying the DCI.

18 Claims, 6 Drawing Sheets

Related U.S. Application Data

(60) Provisional application No. 63/060,465, filed on Aug. 3, 2020.

(51) Int. Cl.
  *H04W 24/10* (2009.01)
  *H04W 72/541* (2023.01)

(58) Field of Classification Search
  CPC ..... H04W 76/20; H04W 28/02; H04W 28/06; H04W 24/02; H04W 52/02; H04W 4/00; H04L 1/00; H04L 1/18; H04L 5/00; H04L 27/26; H04L 25/03
  USPC .......................................................... 370/329
  See application file for complete search history.

(56) References Cited

U.S. PATENT DOCUMENTS

| | | | | |
|---|---|---|---|---|
| 8,401,542 | B2 * | 3/2013 | Chung | H04L 5/0007 |
| | | | | 455/423 |
| 8,606,186 | B2 * | 12/2013 | Aithal | H04W 76/30 |
| | | | | 455/406 |
| 8,804,646 | B2 * | 8/2014 | Tan | H04W 72/04 |
| | | | | 370/329 |
| 9,246,651 | B2 * | 1/2016 | Guo | H04L 1/203 |
| 9,788,342 | B2 * | 10/2017 | Lee | H04L 1/1864 |
| 9,998,268 | B2 * | 6/2018 | Heo | H04L 5/0037 |
| 10,063,351 | B2 * | 8/2018 | Blankenship | H04L 5/0039 |
| 10,271,321 | B1 * | 4/2019 | Patel | H04L 1/0046 |
| 10,348,445 | B2 * | 7/2019 | Rask | H04L 1/0006 |
| 10,728,800 | B2 * | 7/2020 | Suzuki | H04L 5/0048 |
| 11,818,712 | B2 * | 11/2023 | Grossmann | H04L 1/0038 |
| 2009/0088148 | A1 | 4/2009 | Chung | |
| 2012/0294271 | A1 | 11/2012 | Matsumoto | |
| 2013/0183987 | A1 | 7/2013 | Vrzic et al. | |
| 2014/0036747 | A1 | 2/2014 | Ravikiran | |
| 2018/0083733 | A1 | 3/2018 | Chen | |
| 2018/0317129 | A1 | 11/2018 | Suzuki et al. | |
| 2020/0169274 | A1 | 5/2020 | Ko et al. | |

OTHER PUBLICATIONS

International Search Report in the international application No. PCT/US2021/017502, malled on Apr. 27, 2021.
Written Opinion of the International Search Authority in the international application No. PCT/US2021/017502, mailed on Apr. 27, 2021.

* cited by examiner

LATENCY REDUCING TECHNIQUES FOR CONTROL CHANNEL DECODING

CROSS-REFERENCE TO RELATED APPLICATION(S)

The present application is a continuation of International Application No. PCT/US2021/017502 filed on Feb. 10, 2021, which claims priority to U.S. Provisional Patent Application No. 63/060,465 filed on Aug. 3, 2020, entitled "METHOD FOR BLIND DECODING OF CONTROL CHANNEL," both of which are herein incorporated by reference in their entireties.

BACKGROUND

In wireless communication systems, the communications are generally coded prior to transmission. The data in coded formats with header information that can help the recipient decode the data upon receipt. The recipient (e.g., a terminal device), then, must be aware of where the information needed to decode the coded values is within the signal. The information needed for decoding is called the downlink control information (DCI), which is conveyed in PDCCH (Physical Downlink Control Channel) channel. Further, the DCI can be transmitted on multiple control channel elements (CCEs) within a signal. The recipient of the signal needs to parse the CCEs to determine the location of the DCI prior to decoding the CCEs.

Traditionally, the method used to find the information is a brute-force approach. More specifically, the recipient can search one-by-one in a first come-first search basis. In other words, the recipient decodes and reads each resource block, in a linear fashion, until the DCI is found.

SUMMARY

The disclosed techniques relate to latency reducing techniques for a network device, and more particularly, to latency reducing techniques for decoding a control channel at a network device.

A first aspect of the present application provides a method for reducing latency. The method includes: a terminal receives a physical downlink control channel (PDCCH) signal, the PDCCH signal including a plurality of groups of control channel elements (CCEs), herein each group of CCEs is associated with an aggregation level of a plurality of aggregation levels; the terminal determines a probability of downlink control information (DCI) being present at each aggregation level of the plurality of aggregation levels based on a packet error rate (PER); and the terminal decodes the groups of CCEs in an order, herein the order is based on the probability of the DCI being present at each aggregation level.

A second aspect of the present application provides a method for reducing latency. The method includes: a network node transmits a physical downlink control channel (PDCCH) signal, the PDCCH signal including a plurality of groups of control channel elements (CCEs), herein each group of CCEs is associated with an aggregation level of a plurality of aggregation levels; the network node causes determination of a probability of downlink control information (DCI) being present at each aggregation level of the plurality of aggregation levels based on a packet error rate (PER); and the network node causes decodes of the groups of CCEs in an order, herein the order is based on the probability of the DCI being present at each aggregation level.

A third aspect of the present application provides a system. The system includes a receiver and a processor. The receiver is configured to receive a physical downlink control channel (PDCCH) signal, the PDCCH signal including a plurality of groups of control channel elements (CCEs), herein each group of CCEs is associated with an aggregation level of a plurality of aggregation levels. The processor is configured to determine, based on a packet error rate (PER), a probability of downlink control information (DCI) being present at each aggregation level of the plurality of aggregation levels; and decode the groups of CCEs in an order, herein the order is based on the probability of the DCI being present at each aggregation level.

BRIEF DESCRIPTION OF THE DRAWINGS

The present embodiments are illustrated by way of examples and are not intended to be limited by the figures in the accompanying drawings.

DETAILED DESCRIPTION

Figure 1:
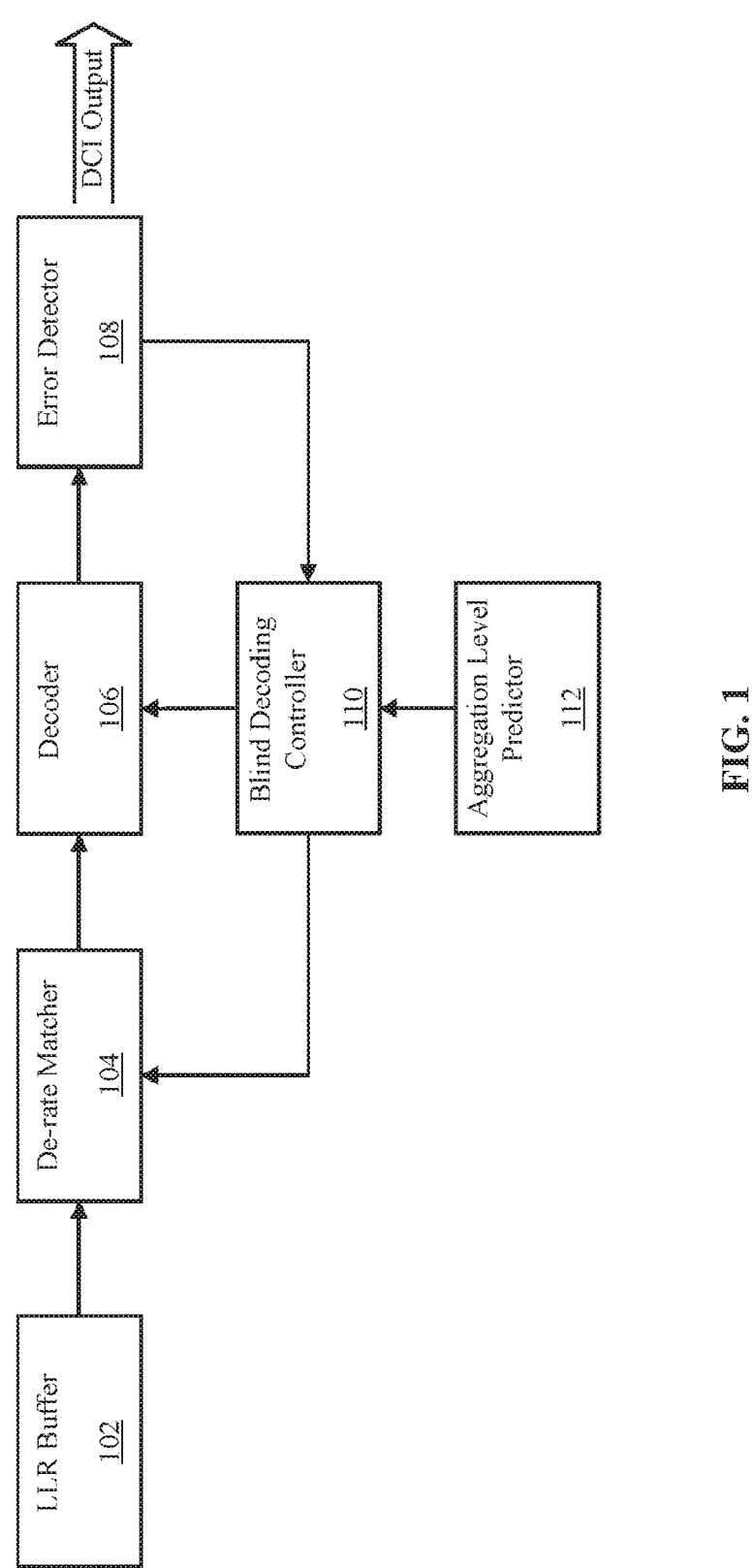
FIG. 1 illustrates a high level block diagram of the components of a receiver.

Telecommunication systems require recipients of signals to decode the values within the signal. Each signal can carry multiple types of data such as control data and user data. Due to this, the recipient of the signal has to decode each signal to determine the pieces of the data that apply to certain situations. For instance, certain data might provide instructions to the recipient on how to decode the remaining data. Other data may provide details regarding the sequence at which the recipient should read the data. As such, decoding the signal is a primary task of a recipient.

In particular, in the downlink direction, a terminal device needs to decode a received signal. To do so, a terminal device needs to parse through the signal to find the downlink control information (DCI) that is needed to decode the signal. The DCI can be stored in multiple resource blocks that are aggregated into control channel elements (CCEs). An aggregation level is the number of CCEs used for sending control information such as DCI. The aggregation level often has values such as 1, 2, 4, and 8.

DCI can also be used by a network to, for example, instruct a terminal to perform an uplink transmission, or adjust timing or power of a communication. Therefore, due to the variability of instructions, the bit length of information in a DCI is also variable. Another factor is the signal to noise ratio (SNR). The SNR of the received signal at a terminal can be low or high. When SNR of the received signal at a terminal is high, the network needs fewer resources (e.g., CCE with a smaller aggregation level) to transmit DCI.

When the SNR is low, the network needs more resources (e.g., CCE with a larger aggregation level) to transmit DCI.

Generally, the resource range for a network to send the DCI is large. Although the terminal, usually, knows the DCI range, the terminal does not know whether the network sends the DCI or not, in which specific resources the DCI is sent, and which DCI format the network sends the DCI, if at all. As mentioned above, the common approach is a linear search of CCEs with all possible sizes as they are received. In other words, a terminal device searches one-by-one until the CCEs with the DCI is found. This linear search causes multiple issues. A few of the multiple issues are described below.

First, the linear search technique uses more power than is necessary. Due to the nature of a linear search, there are situations where the DCI is found in the first hypothesis (with certain combination of CCEs) that is decoded. However, there are also situations where the DCI is found in the last hypothesis (with another combination of CCEs) that is decoded. As one can imagine, the inherent nature of the linear search leads to the assumption that, on average, the DCI is found in the hypothesis that is in the middle of the first and last hypothesis. In any case, the power consumption also varies with where the DCI is found. Given that power consumption is a primary factor in the design of terminal device, the power consumption for finding the DCI must also be optimized.

Second, complementary to the power usage problem, is the usage of computing resources to find the DCI. A terminal device has limited capacity and computing capability, and thus, the limited resources need to be used efficiently. In this case, the linear search for the DCI uses the limited capabilities, which can be applied to other tasks. In other words, a terminal device may need allot computing capabilities for finding the DCI irrespective of whether the DCI is found in the first hypothesis or last hypothesis because the terminal device needs to allot resources for the worst-case scenario. Due to this, the allotted computed resources can be more efficiently used.

Third, the linear search causes latency; in particular, DCI detection latency. This is especially problematic in situations where the terminal device is communicating on multiple carriers. Large DCI detection latency leads to other consequences such as larger buffer sizes. Larger buffer size requirements, in turn, leads to more hardware space being used. Further, DCI detection latency leads to a poor user experience. For instance, in an autonomous driving car, the car is expected to process information and directions in near-real-time. If there is DCI latency, the car may not process information as quickly as it should, which may lead to emergency situations. As such, the linear search can cause issues in the design of the terminal device and in application.

Introduced here, therefore, is at least one technique for more efficiently detecting the DCI. In particular, the technique includes determining a probability that a DCI is transmitted at a given aggregation level. The probability is dependent on the packet error rate (PER). The PER can depend on factors such as the signal to noise ratio (SNR) and fading measurements (e.g., fading channel). In addition to the PER, the probability can depend on the reception history of the terminal device. For instance, the logic behind technique can be based on the principle that distance from the base station effects the PER and thus, the probability of DCI being transmitted at each aggregation level. If the terminal device is close to the base station, the SNR is likely to be high. Due to this, the DCI is more likely to be transmitted at lower aggregation levels. This is because, at low SNR values, the base station can send DCI without having to send multiple copies to accommodate for noise. Similar logic can be applied to the fading measurements. Fading measurements can be affected by factors such as the Doppler shift and frequency selectivity. For example, if a PDCCH is transmitted with a high error rate due to Doppler shift, the terminal can determine that it is more likely that the DCI is transmitted with a high aggregation level. Lastly, past reception history can help determine the probability that a base station transmits DCI at a particular aggregation level. For instance, the reception history may indicate that a majority of the DCI was previously transmitted at aggregation level 4. Thus, the terminal can determine that CCE with aggregation level 4 are more likely to be carrying the DCI, than other CCEs. In this manner, the technique addresses the issues described above and others by efficiently determining where the DCI is located.

In following description, the examples of a terminal device (e.g., mobile device) and receiver are used, for illustrative purposes only, to explain various aspects of the techniques. For example, a cellular phone can apply a technique for locating the DCI. Note, however, the techniques disclosed here are not limited to applicability to terminal devices, receivers, or to any other particular kind of devices. Other device, for example, electronic device or systems (e.g., base stations) may adapt the techniques in a similar manner.

Further, references are made to downlink directions and downlink control information (DCI). These references are also made for illustrative purposes only. As such, note that the techniques described herein can be applied in other directions (e.g., uplink), and for locating other information within a signal.

Control Channel Decoding Overview

FIG. 1 illustrates a high level block diagram 100 of the components of a receiver. Diagram 100 includes LLR buffer 102, de-rate matcher 104, decoder 106, error detector 108, blinding decoding controller 110, and aggregation level predictor 112. The output from these components and the techniques that are applied between the components results in the DCI output to another component of the receiver (e.g., terminal device).

In some embodiments, the LLR buffer 102 can be programmed to store LLRs. For example, the LLR buffer 102 can store the LLR values for each aggregation level. Alternatively or additionally, the LLR buffer 102 can receive input from a processor (not shown in FIG. 1).

The de-rate matcher 104 receives input from the LLR buffer 102 according to the CCE location. Further, the de-rate matcher 104 receives input from the blind decoding controller 110 (described below). Generally, the de-rate matcher 104 can receive instructions regarding which CCEs to decode from the blind decoding controller 110. Based on the instructions, the de-rate matcher 104 can pull the LLR information for the CCE from the LLR buffer 102. For example, the blind decoding controller 110 can indicate that a given set of CCEs can be decoded. In response, the de-rate matcher 104 can pull the LLRs for the set of CCEs.

The decoder 106 can decode the CCE to retrieve the DCI. The decoder 106 can receive inputs from the de-rate matcher 104 and the blind decoding controller 110. The decoder 106 can apply various decoding techniques depending on the technology that the receiver is using. For example, the decoder 106 can use Viterbi decoding techniques for Long Term Evolution (LTE) and Polar decoding for new radio (NR). In some embodiments, the decoder 106 can comprise multiple sub-decoders that each apply a different decoding technique. The decoder 106 can also include a decision module which is configured to stream CCEs to the appropriate sub-decoder. For instance, the decoder 106 can include a sub-decoder that applies only Viterbi techniques and another sub-decoder that applies only Polar decoding techniques. The decision module can, then, based on the current technology, direct data to the appropriate sub-decoder.

The decoder 106 can output to the error detector 108. The error detector 108 can determine if the decoded DCI is a valid DCI. To do so, the error detector 108 can perform error detection on each result from the decoder 106. The error detector 108 can apply known error checks such as cyclic redundancy checks (CRC), decoding metric checks, and/or DCI field validness checks. If the error detector 108 determines that the decoded DCI does have an error, the decoded DCI can be discarded. Upon discarding, the error detector 108 can indicate to the blind decoding controller 120 that further decoded is required. In some cases, the error detector 108 can move on the next decoded DCI. If the decoded DCI is valid, the error detector 108 can output the DCI for receipt by another component of the receiver. In some embodiments, the valid DCI can also be output to the blind decoding controller 110, as explained below.

The blind decoding controller 110 can determine the order in which DCI hypothesis (with certain combination of CCEs) are decoded. In some embodiments, the blind decoding controller 110 can receive information of a valid DCI from the error detector 108. The blind decoding controller 110 can use this information to skip other hypotheses that have overlapping CCEs with the decoded DCI to avoid some overhead. For instance, the error detector 108 can inform the blind decoding controller 110 that a DCI from a given CCE(s) is valid. The blind decoding controller 110, subsequently, can determine that another hypothesis overlaps the detected DCI. Based on this determination, the blind decoding controller 110 can instruct decoder 106 to skip decoding the other hypothesis.

Further, the blind decoding controller 110 can receive input from the aggregation level predictor 112. The aggregation level predictor 112 can perform techniques to determine the probability of each aggregation level of the DCI to be detected. Based on the probability, the aggregation level predictor 112 can instruct the blind decoding controller 110 to provide instructions to the de-rate matcher 104 and decoder 106 to decode CCE(s) based on the probabilities. For instance, the decoding can be done in descending order of probability. The CCE(s) with the aggregation level corresponding to the highest probability of having the DCI can be decoded first. Subsequently, the CCEs with the aggregation level corresponding to the second highest can be decoded. The decoding can be done in this descending manner until the DCI is found.

The probability of a DCI being transmitting with an aggregation level can depend on the packet error rate (PER). PER can be affected by factors such as the signal to noise ratio (SNR) and/or the fading measurements. In addition to the PER, the probability can be affected by the reception history. Determining the probability based on SNR can be dependent on the principle that the (PER) and SNR are inversely proportional. The transmitter (e.g., base station) can be aware of the terminal's SNR from terminal's channel state information feedback. When the terminal's SNR is low, the transmitter (e.g., base station) sends multiple copies of the DCI. The transmitter does this to better ensure that the receiver can piece together the entire signal, even when certain packets are lost during transmission or includes incorrect bits.

Further, SNR is generally high when the distance between the transmitter and receiver is low. This is because it is less likely that noise can interfere with a signal when the transmission distance is low. As such, based on the SNR a receiver can determine whether a PER is high or low. Based on the PER, subsequently, the receiver can also determine whether multiple copies of the DCI were likely transmitted.

For example, if the transmitter has to transmit multiple copies, the transmitter can use a higher aggregation level. As mentioned above, because each CCE contains 72 resource elements, the transmitter may increase the aggregation level when sending multiple copies (e.g., more symbols). For instance, a base station can be far enough away from the receiver that the base station can determine to send three copies of DCI information that is 90 bits. As such, the transmission includes 270 bits of DCI information. The transmission can occur over a QPSK technology, which permits each resource element to include two bits. Thus, for 270 bits, based on the capabilities of CCEs on QPSK, requires at least 135 resource elements, which means at least 2 CCEs to transmit the three copies of the DCI. Further, because at least 2 CCE's required, the aggregation level is at least two.

On the receiver side, the receiver may not be aware of the details mentioned above. However, the receiver can, for example, based on the distance from the base station and, determine that the SNR is likely to be low, which indicates that the PER is likely to the high. Further, rather than derive the SNR from other values (e.g., distance from the base station), the receiver can include capabilities to measure the SNR of a given signal. For example, upon receipt, the receiver can measure the SNR the signal and information the aggregation level predictor 112.

Due to the determination and/or SNR measurement, the aggregation level predictor 112 can predict the probability of each aggregation level carrying the DCI. In the example above, the aggregation level predictor 112 can determine that aggregation level 4 has the highest probability, with aggregation levels 8, 2, and 1 begin the next highest probable, in order. The aggregation level predictor 112 can instruct the blind decoding controller 110 to decode CCE with the aggregation level 4 first, then 8, then 2, and lastly, 1.

For example, the probability of an aggregation level carrying a DCI based on PER can be calculated as follows. The target PER can be denoted as: $per_{target}$. The SNR-to-PER relationship for each aggregation level can be determined based on curve $p_{al}(snr)$. Once the receive measures the SNR value, the receiver map the measured SNR value on the curve to determine the likely aggregation level of the signal corresponding to the measured SNR value. The likely aggregation level can be denoted as $per_{al}=p_{al}(snr)$. In this manner, the aggregation level with the largest probability can be determined $$al_1 = \arg\min_{al}(per_{al} <= per_{target})$$

and the aggregation level can be ordered by descending probabilities as $al_1$, $al_1*2$, . . . , max AL, $al_1/2$, . . . , 1.

Another factor in determining the probability can be fading measurements. The fading measurements can be affected by factors such as Doppler shift or delay spread.

Similar to SNR, the relationship between PER and the fading measurements can help determine the probabilities of each aggregation level carrying the DCI. For example, the PER can increase due to occurrences of Doppler shift. Thus, the aggregation level predictor 112 can determine higher probabilities for the higher aggregation levels.

In some embodiments, the aggregation level predictor 112 can use both the fading measurements and the SNR measurement to determine a probability. For instance, the aggregation level predictor 112 can determine that a fading measurement can offset the SNR by a delta, $\Delta$. A SNR-to-PER curve, $p_{al}(snr)$, can be used to map the measured SNR in view of the delta as al $per_{al}=p_{al}(snr-\Delta)$. Subsequently the aggregation level with the highest probability can be determined as $$al_1 = \arg \min_{al}\left(per_{al} <= per_{target}\right)$$

and the aggregation levels can be sorted based on probability as $al_1$, $al_1*2$, . . . , max AL, $al_1/2$, . . . , 1.

Yet another factor that can help determine the probability is the reception history of the receiver. The reception history can be based on the communication between the receiver and a particular transmitter, based on all the communication that the receiver has received, based on the distance between the receiver and the transmitter, or other such categories. In any case, the general principle being that the aggregation level predictor 112 can determine probabilities based on the previous reception history of the terminal device. For example, if the receiver has previously received 60% of the received DCI at aggregation level 4, and 20% at aggregation level 2, and another 20% at aggregation level 8, then the probabilities can reflect this reception history. In another example, the aggregation level predictor 112 can determine that at the current between the receiver and transmitter at which the signal was received, the receiver previously received DCI at aggregation level 4 a majority of the time. Thus, the probabilities can reflect this reception history.

In some embodiments, the reception history can be categorized based on the SNR. For example, an SNR range can be divided into M+1 bins, as in: $(-\infty, SNR_1]$, $(SNR_1, SNR_2]$, . . . , $(SNR_{M-1}, SNR_M]$, $(SNR_{M-1}, +\infty)$. The SNR of a signal can be measured as "snr". The "snr" value can then be placed in the right bin, where $SNR_{m-1} < snr \leq SNR_m$. From this placement, the aggregation level predictor 112 can determine the probabilities.

In some embodiments, after the "snr" is placed in a bin, the aggregation level predictor 112 can determine whether the number of valid DCI collected with SNR within the range of the bin surpasses a predetermined threshold value. If the number of valid DCI does surpass the predetermined threshold, the aggregation level predictor 112 can determine the probability based on the reception history. If the number of valid DCI is lower than the predetermined threshold value, the aggregation level predictor 112 can apply one of the other techniques mentioned above (e.g., fading measurement).

In this manner, the receiver can decode CCE is an order that is based on the probability of DCI being transmitted with a given aggregation level. The probability can be based on the PER, which can be affected by factors such as the SNR, fading measurements, and reception history.

Examples of Ordering CCEs

Figure 2A:
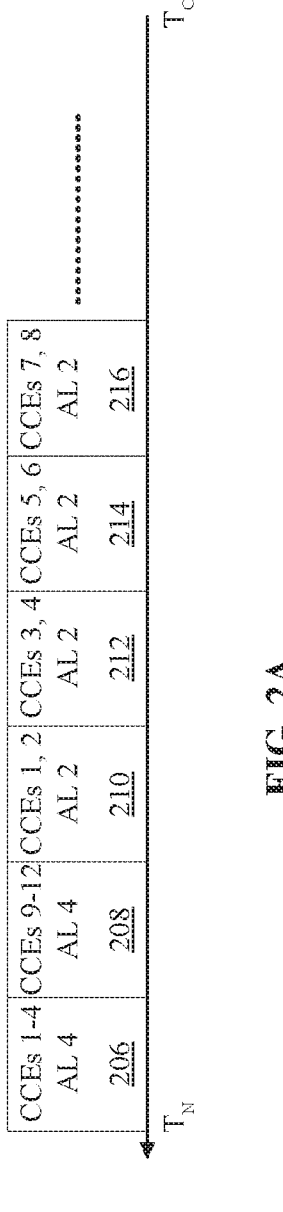
FIG. 2A illustrates an example of control channel elements (CCEs) being received during a time period.

FIG. 2A illustrates an example 200 of control channel elements (CCEs) being received during a time period. The example 200 includes CCEs 206, 208, 210, 212, 214, and 216 that are using corresponding aggregation levels (ALs). In the example 200, the receiver can receive an AL2 hypothesis with CCE 7 and CCE 8 first, then AL2 hypothesis with CCE 5 and CCE 6, then an AL2 hypothesis with CCE 3 and CCE 4, then an AL2 hypothesis with CCE 1 and CCE 2, then an AL4 hypothesis with CCEs 9-12, then an AL4 hypothesis with CCEs 1-4, and so on until all AL and corresponding CCEs are received. In some embodiments, as in 206, a CCE can be used in different hypotheses with different ALs. For example, a receiver can receive an AL2 hypothesis with CCE1-4, as in 210 and 212, and also with AL4, as in 206.

Figure 2B:
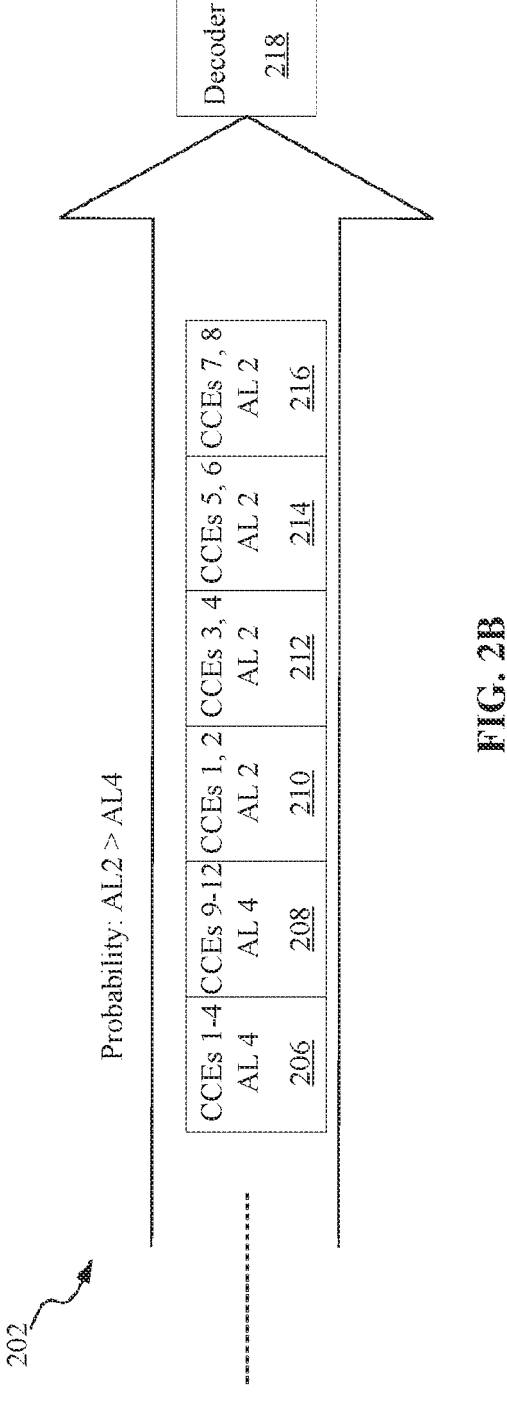
FIG. 2B illustrates an example of the order that the CCEs are decoded.
Figure 2C:
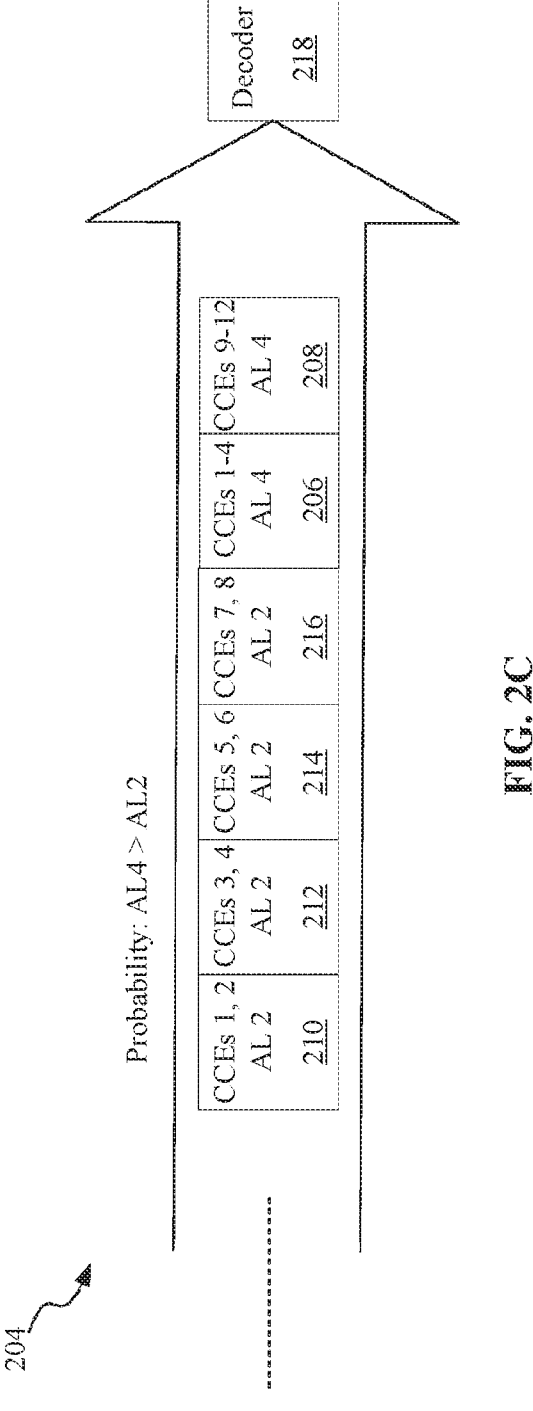
FIG. 2C illustrates another example of the order that the CCEs are decoded.

The time for receipt can range between $T_0$ and $T_N$. FIGS. 2A-C are merely examples to illustrate the technology described herein. In particular, an AL can indicate the number of CCEs that are allocated per PDCCH. For instance, an AL4 represents a group of 4 CCEs allocated to a PDCCH, as depicted in FIG. 2A. The relationship between AL and the number of CCEs is shown in Table 1 below:

TABLE 1

| Aggregation Level (AL) | Number of CCEs |
|---|---|
| 1 | 1 |
| 2 | 2 |
| 4 | 4 |
| 8 | 8 |
| 16 | 16 |

FIG. 2B illustrates an example of the order 202 that the CCEs received in example 200 are decoded. In the order 202, a system (e.g., the aggregation level predictor 112) may have determined the probability for each aggregation level and ordered the aggregation levels in descending order. The system can then instruct the decoder 218 to decode the CCEs based on the aggregation level order. In FIG. 2B, the AL 2 is determined to have a higher probability of carrying the DCI than AL 4. Thus, the decoder 218 decodes the CCEs using AL 2 first.

In FIG. 2B, 210, 212, 214 and 216 are using AL 2. When multiple CCEs are using the same aggregation levels, the decoder 218 and/or other system (e.g., aggregation level predictor 112) can determine that the CCEs can be decoded in the order that they were received. Alternatively or additionally, the system can perform additional checks on CCEs using the same aggregation levels. For instance, the system can determine the fading channel for 214 and 216. Based on the fading channel, the order in which they are decoded can be determined. In FIG. 2B, for example, CCE 216 may have been received first, and thus, can be decoded prior to CCE 214.

After the CCEs using AL 2, 210, 212, 214, and 216, the AL with next highest probability is AL 4. In FIG. 2B, CCEs 9-12 and 1-4 (208 and 206, respectively) are using AL 4. Thus, the logic described above can be applied to determined which CCE can be decoded first.

In some embodiments, once the DCI is found, the remaining CCEs may not be decoded. For instance, in FIG. 2B, if the DCI is found in the CCEs 216, the remaining CCEs may not decoded. In some embodiments, the determination to continue decoding can depend on the aggregation level. For example, in AL 2, the system can know that the DCI is segmented over at least two CCEs. Thus, multiple CCEs using AL 2 can be decoded. In FIG. 2B, for example, if the DCI is found in the CCEs 216, the system can continue decoding CCEs using AL 2 until all hypotheses are decoded and obtained.

FIG. 2C illustrates another example 204 of the order that the CCEs are decoded. In FIG. 2C, AL 4 has a higher probability than AL 2 of carrying the DCI. Thus, the decoder 218 decodes the CCEs based on the probability. Again, when multiple CCEs are using the same aggregational levels, the system can determine, for example, which CCE was received first. Based on this determination, the CCEs using the same aggregation levels can be decoded.

Example Methodology

Figure 3:
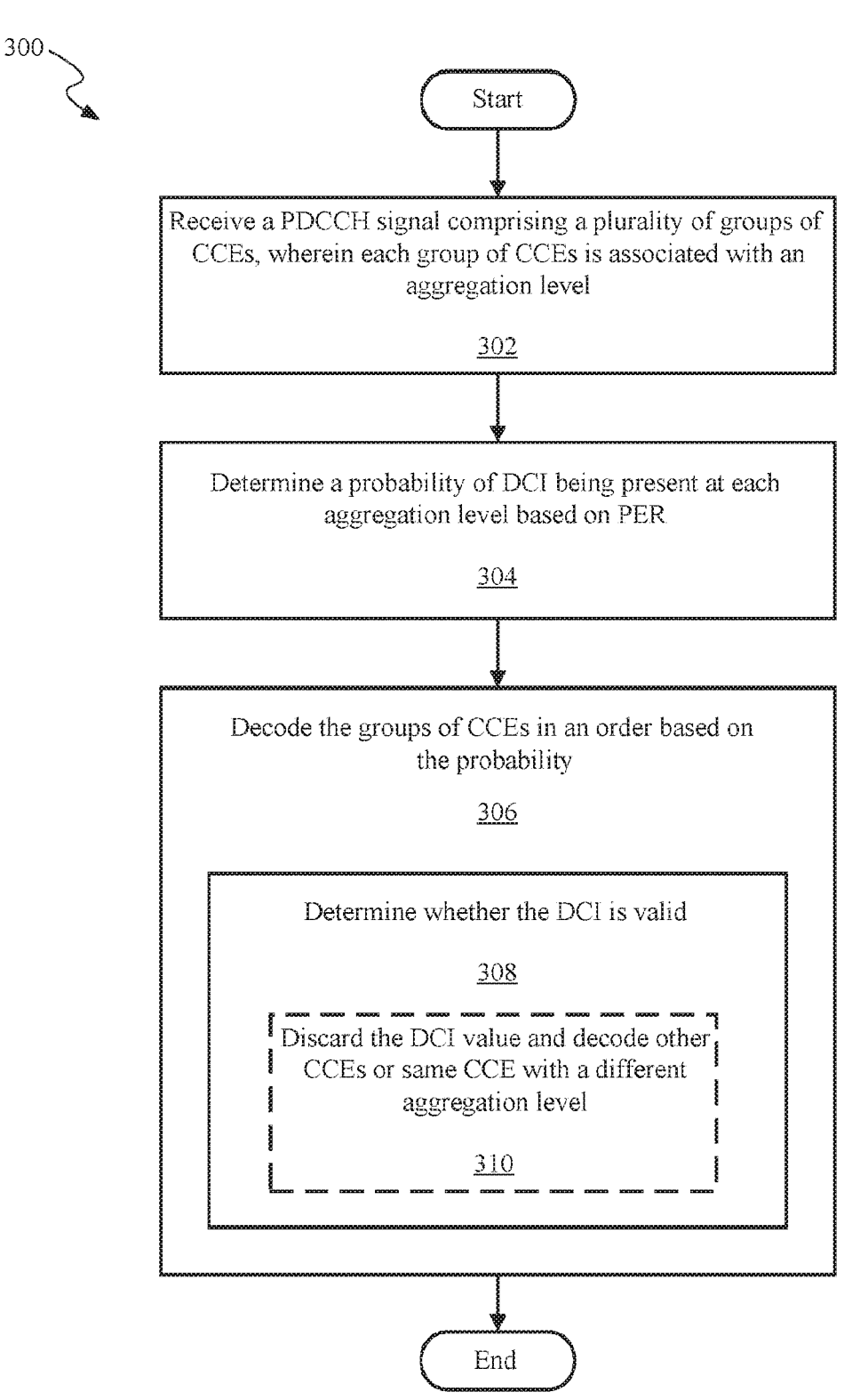
FIG. 3 is a flowchart that illustrates a method for decoding CCEs.

FIG. 3 is a flowchart that illustrates a method 300 for decoding CCEs. The method 300 includes block 302, 304, and 306. Further, the method 300 can optionally include block 308 and 310. The method 300 can be applied by a terminal device such as mobile device (e.g., an iPhone) operating on New Radio (NR) technology or Long Term Evolution (LTE) technology. The terminal device can include a receiver to receive signals from a network node such as base station. The terminal device can also include a processor to perform at least some of the techniques described here in. Further, at least some of the techniques described herein can be applied upon receipt of signals in the downlink plane of telecommunication systems, such as physical downlink control channel (PDCCH). In some embodiments, the method 300 can be applied at a network node such as a based station. In this case, the method 300 include causing the recipient of the PDCCH to determine the probability and decode in an order indicative of the determined probability.

At block 302, a receiver (e.g., a terminal device) can receive a PDCCH signal comprising a plurality of groups of CCEs. Each of the groups of CCEs can be associated with an aggregation level of a plurality of aggregation levels. The aggregation level can be the number of CCEs used to transmit DCI. At block 304, the receiver can determine the probability of the DCI being present at each aggregation level based on the PER. The PER can be based on any of the SNR and/or the fading measurement. Generally, the PER and SNR can be inversely related, and the PER and the fading measurement can be directly related. The fading measurement can be based on channel state information, for example, antenna correlation, Doppler shift, and other such measurements. In addition to PER, the probability can be based on the reception history of the terminal and/or the transmission of the network node. The reception history can be indicative of, for example, the aggregation level of previously received DCI.

Based on the determined probability, at block 306, the terminal can decode the groups of CCEs in an order. The order can reflect the determined probability of the DCI being present at each aggregation level. For example, the decoding can occur from the highest probability aggregation level to the lowest. In some cases, there may be more than one CCE having the same aggregation level. In which case, the terminal can decode the CCEs in the order that they were received by the terminal. In some cases, when the receiver determines the probability of certain aggregation level(s) to be zero, it can skip decoding for those aggregation level(s).

Further, based on the technology, the decoding can include applying different decoding schemes. For instance, if the technology is LTE, the terminal can apply Viterbi decoding algorithms. Alternatively, in NR, the terminal can apply Polar decoding algorithms. In either case, after decoding the CCEs, the terminal, at block 308, can determine whether the DCI is valid. To do so, the terminal can run an error check such as CRC. If the DCI is not valid, based on the error check, the terminal can discard the DCI and proceed to decode the other CCEs or same CCEs with a different aggregation level, at block 310.

Example Computing System

Figure 4:
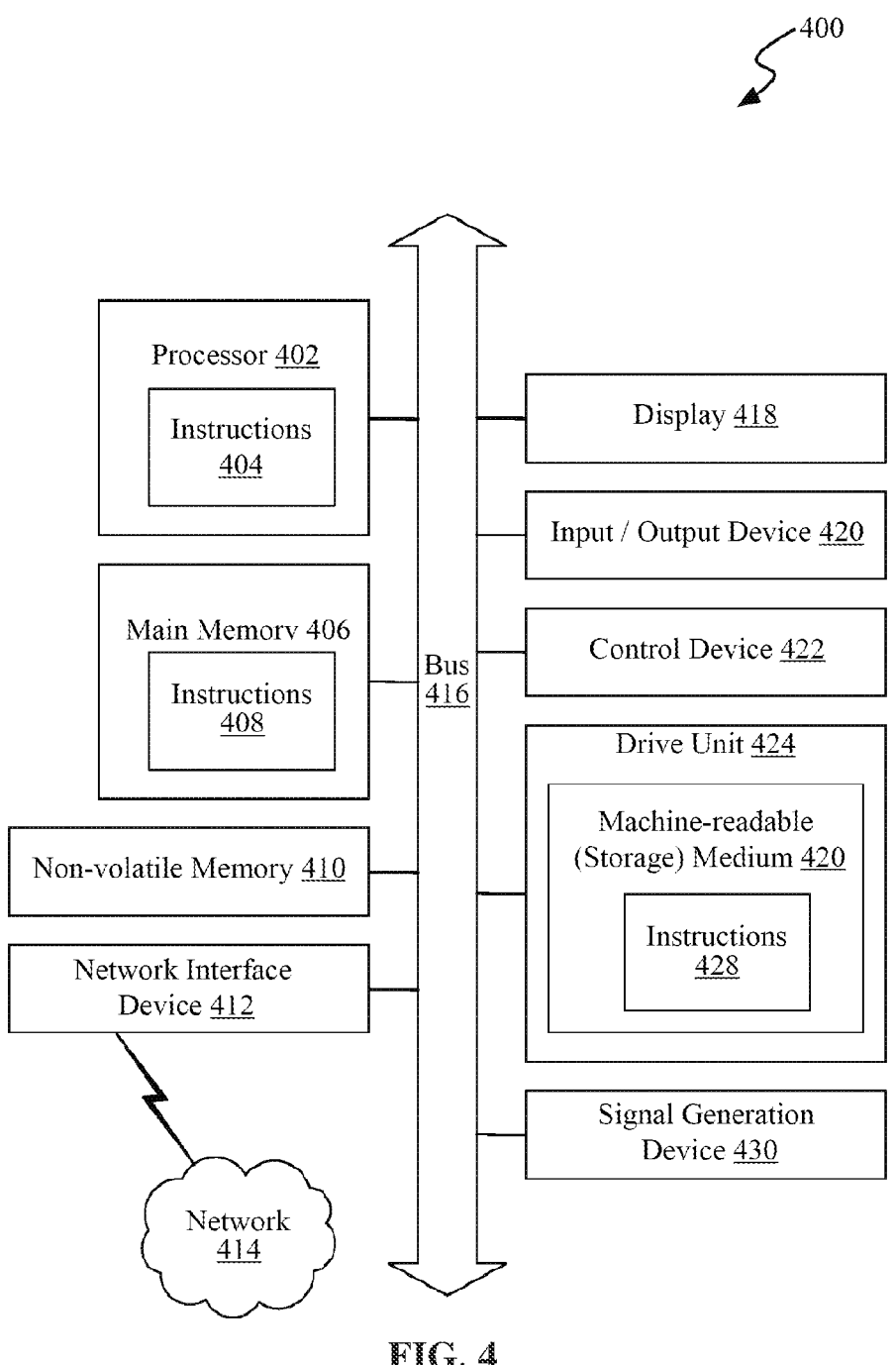
FIG. 4 is a block diagram illustrating a diagrammatic representation of a machine in the example form of a computer system operable to perform aspects of the disclosed technology.

FIG. 4 is a block diagram illustrating a diagrammatic representation of a machine in the example form of a computer system operable to perform aspects of the disclosed technology. For example, processing system 400 may be an example implementation of a network node or terminal device that may implement the techniques introduced above. At least a portion of the processing system 400 may be included in an electronic device (e.g., a computer server) that supports one or more CPNs and/or one or more UPNs. The processing system 400 may include one or more processors 402, main memory 406, non-volatile memory 410, network adapter 412 (e.g., network interfaces), display 418, input/output devices 420, control device 422 (e.g., keyboard and pointing devices), drive unit 424 including a storage medium 426, and signal generation device 430 that are communicatively connected to a bus 416. The bus 416 represents any one or more separate physical buses, point to point connections, or any combination thereof, connected by appropriate bridges, adapters, or controllers. The bus 416, therefore, can include, for example, a system bus, a Peripheral Component Interconnect (PCI) bus or PCI-Express bus, a HyperTransport or industry standard architecture (ISA) bus, a small computer system interface (SCSI) bus, any version of a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 400 operates as a standalone device, although the processing system 400 may be connected (e.g., wired or wirelessly) to other devices. For example, the processing system 400 may include a terminal that is coupled directly to a network appliance. As another example, the processing system 400 may be wirelessly coupled to the network appliance.

In various embodiments, the processing system 400 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system 400.

While the main memory 406, non-volatile memory 410, and storage medium 426 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 428. The term "machine-readable medium" and "storage medium" shall also be taken to include any medium that is capable of storing, encoding, or carrying a set of instructions for execution by the processing system 400 and that cause the processing system 400 to perform any one or more of the methodologies of the presently disclosed embodiments.

In general, the routines that are executed to implement the technology disclosed above may be implemented as part of an operating system or an application, component, program, object, module, or sequence of instructions (collectively referred to as "computer programs"). The computer programs typically comprise one or more instructions (e.g., instructions 404, 408, 428) set at various times in various memory and storage devices in a computer, and that, when read and executed by one or more processing units or processors 402, cause the processing system 400 to perform operations to execute elements involving the various aspects of the above disclosure.

Moreover, while embodiments have been described in the context of fully functioning computers, computer systems and/or other devices, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 410, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 412 enables the processing system 400 to mediate data in a network 414 with an entity that is external to the processing system 400, such as a network appliance, through any known and/or convenient communications protocol supported by the processing system 400 and the external entity. The network adapter 412 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 412 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination of such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

CONCLUSION

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying claims.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for reducing latency, comprising:
receiving, at a terminal, a physical downlink control channel (PDCCH) signal, the PDCCH signal comprising a plurality of groups of control channel elements (CCEs),
wherein each group of CCEs is associated with an aggregation level (AL) of a plurality of aggregation levels;
determining, by the terminal, based on a packet error rate (PER), a probability of downlink control information (DCI) being present at each aggregation level of the plurality of aggregation levels; and
decoding, by the terminal, the groups of CCEs in an order, wherein the order is based on the probability of the DCI being present at each aggregation level,
wherein the PER is based on any of the signal to noise ratio (SNR) of the PDCCH signal, a fading measurement of the PDCCH signal, or any combination thereof.

2. The method of claim 1, wherein the PER and the SNR are inversely related, and wherein the PER and the fading measurement are directly related.

3. The method of claim 1, wherein the fading measurement is based on any of a delay caused by Doppler shift, frequency selectivity, or any combination thereof.

4. The method of claim 1, wherein the probability is further based on a reception history of the terminal; wherein the reception history is indicative of an aggregation level of previously received DCI.

5. The method of claim 1, wherein the order is from a highest probability to a lowest probability.

6. The method of claim 1, wherein one or more CCEs are associated with the same aggregation level, the method further comprising:
decoding the one or more CCEs based on a sequence in which the one or more CCEs were received by the terminal.

7. The method of claim 1, wherein the aggregation level is indicative of a number of CCEs used to transmit the DCI.

8. The method of claim 1, wherein the terminal is operating in Long Term Evolution (LTE) technology, and wherein decoding the plurality of CCEs further comprising:
applying Viterbi decoding algorithms.

9. The method of claim 1, wherein the terminal is operating New Radio (NR) technology, and wherein decoding the plurality of CCEs further comprising:
applying Polar decoding algorithms.

10. The method of claim 1, further comprising:
in response to decoding a given CCE including the DCI, determining whether the DCI is valid based on results of an error check.

11. The method of claim 10, wherein performing the error check comprises:
performing a cyclic redundancy check (CRC) to detect changes in the DCI.

12. The method of claim 10, further comprising:
in response to determining that the DCI is not valid, discarding the DCI and decoding remaining CCEs of the plurality of CCEs or decoding the given CCE with a different aggregation level.

13. A method for reducing latency, comprising:
transmitting, by a network node, a physical downlink control channel (PDCCH) signal, the PDCCH signal comprising a plurality of groups of control channel elements (CCEs),
wherein each group of CCEs is associated with an aggregation level (AL) of a plurality of aggregation levels;
causing, by the network node, based on a packet error rate (PER), determination of a probability of downlink control information (DCI) being present at each aggregation level of the plurality of aggregation levels; and
causing, by the network node, decoding of the groups of CCEs in an order, wherein the order is based on the probability of the DCI being present at each aggregation level,
wherein the PER is based on any of the signal to noise ratio (SNR) of the PDCCH signal, a fading measurement of the PDCCH signal, or any combination thereof.

14. The method of claim 13, wherein the probability is further based on a transmission history of the network node.

15. The method of claim 13, wherein the order is from a highest probability to a lowest probability.

16. The method of claim 13, wherein the PDCCH signal is transmitted to a terminal device.

17. A system comprising:
a receiver through which to receive, a physical downlink control channel (PDCCH) signal, the PDCCH signal comprising a plurality of groups of control channel elements (CCEs),
wherein each group of CCEs is associated with an aggregation level of a plurality of aggregation levels;
a processor configured to:
determine, based on a packet error rate (PER), a probability of downlink control information (DCI) being present at each aggregation level of the plurality of aggregation levels; and
decode the groups of CCEs in an order, wherein the order is based on the probability of the DCI being present at each aggregation level,
wherein the PER is based on any of the signal to noise ratio (SNR) of the PDCCH signal, a fading measurement of the PDCCH signal, or any combination thereof.

18. The method of claim 5, wherein the aggregation level with the highest probability is determined as $$al_1 = \underset{al}{\arg\min}(\text{per}_{al} <= \text{per}_{target}),$$

and the order is determined as $al_1$, $al_1*2$, . . . , max AL, $al_1/2$, . . . , 1, where $p_{target}$ is a target PER and $\text{per}_{al}$ is the PER of each respective aggregation level of the plurality of aggregation levels.

* * * * *